Patented Nov. 28, 1939

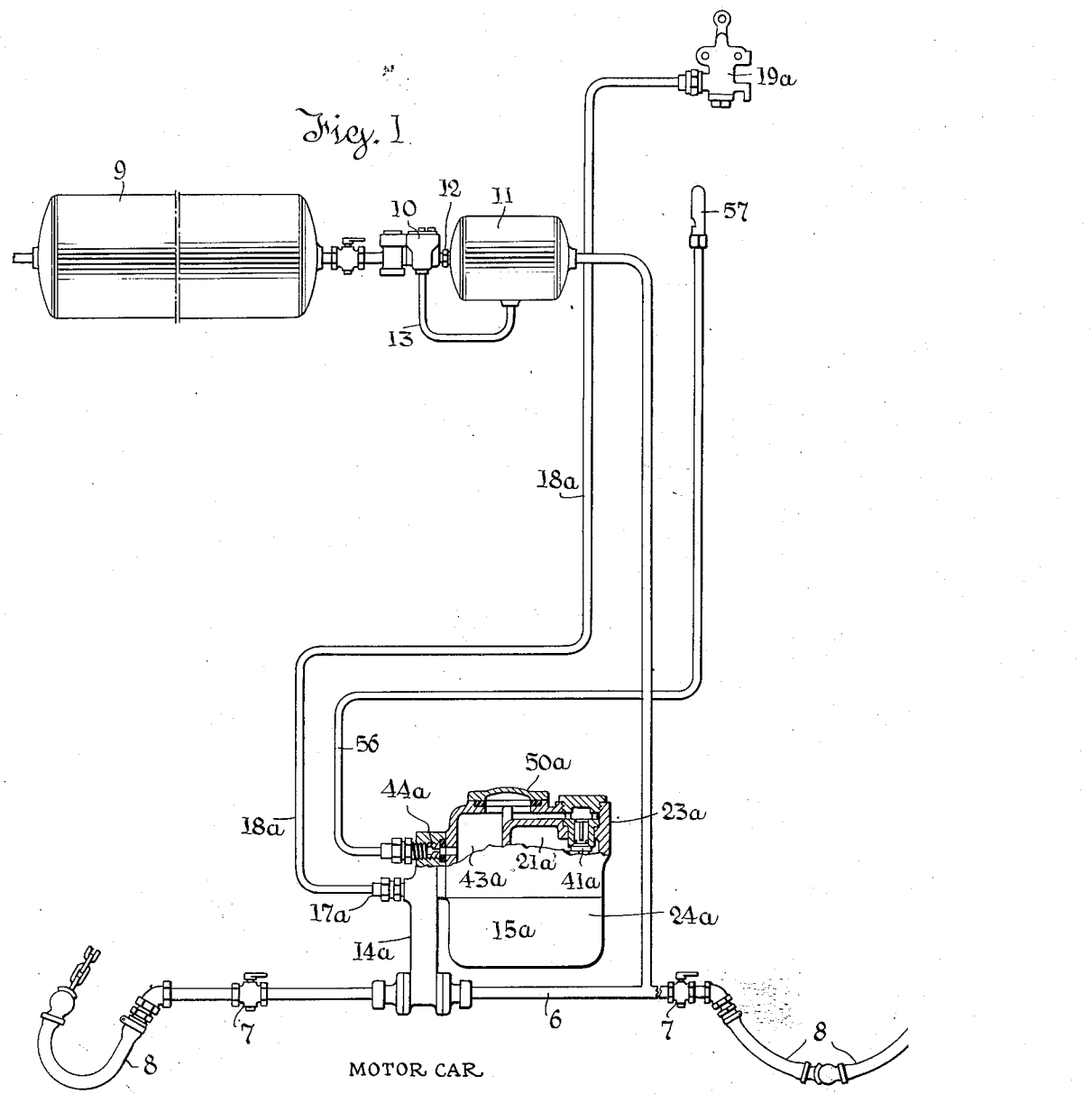

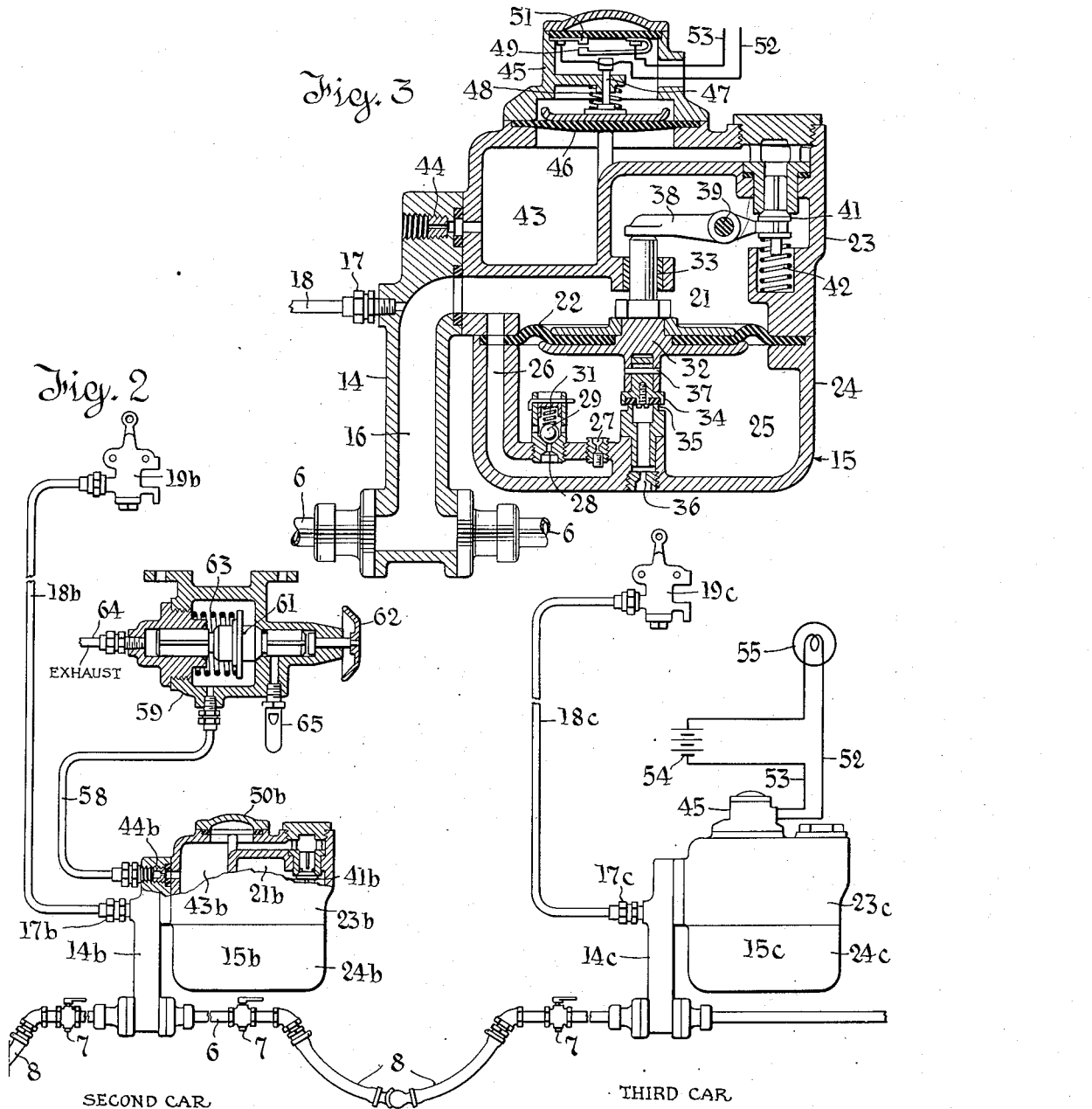

2,181,225

UNITED STATES PATENT OFFICE 2,181,225

PNEUMATIC SIGNALING DEVICE

Charles A. Campbell, Watertown, N. Y., assignor to The New York Air Brake Company, a corporation of New Jersey Application October 6, 1938, Serial No. 233,678

6 Claims. (Cl. 116—55)

This invention relates to pneumatic signal devices of the type used on railway trains. In streamlined trains involving close coupling of cars equipped with air conditioning apparatus which entails the closure of all windows at all times, the engineman cannot successfully acknowledge signals received from the conductor by the use of the locomotive whistle. This is particularly true with modern types of air whistles which have a strong forward directional characteristic. In consequence a substantial demand is developing for a two way signaling system which will avail of the signal pipe now standard on most passenger trains.

Such systems have heretofore been proposed. Probably the best embodiment so far suggested is described in the patent to McCune, No. 1,758,711, May 13, 1930. In this device a signal valve, comprising a chamber charged through a restricted port from the signal pipe and a valve actuating diaphragm interposed between such chamber and the signal pipe, controls a vent from the signal pipe. The air so vented from the signal pipe is used to operate a local signal whistle. The diaphragm mechanism just described also opens an equalizing connection between the signal pipe and the chamber, so that as soon as the device responds to a reduction of signal pipe pressure and vents the signal pipe to blow the whistle and accelerate the signal pipe reduction, the signal valve device returns to its normally closed position and is immediately conditioned to respond to a second reduction of signal pipe pressure. In this last feature resides the chief difficulty in the McCune system.

It is possible to tune a signal system of the McCune type so that the signal propagation rate is approximately one thousand feet per second, which is close to the theoretical limit. However, when so arranged, the signal valve is extremely unstable. Because it is conditioned for a second actuation almost instantly, it will often respond to the secondary pressure wave or echo which occurs in the signal pipe after the initial reduction. According to the present invention a very sensitive signal device is produced which becomes temporarily stable after each response, so that it will not respond to the echo or wave action in the pipe. Since this wave action subsides within the normal interval between signal actuations, operative characteristics need not be impaired. The valve can be arranged to resume its normal sensitivity before a second actuation is required.

The important operative feature of the improved signal valve is that when the diaphragm responds to a signal pipe pressure reduction and vents the signal pipe at a restricted rate (such venting being availed of when desired to operate the signal) the chamber is vented to atmosphere at a somewhat greater rate, with the result that the signal pipe vent is promptly closed and the diaphragm is rendered impotent to reopen it until the chamber is recharged. To recharge it under such conditions and in a reasonably definite time interval, recourse is had to a loaded one way flow valve which opens when signal pipe pressure predominates substantially over chamber pressure.

In conjunction with this loaded valve is used a constantly open stabilizing choke whose capacity is such as to protect the diaphragm against response to slow or minor fluctuations of signal pipe pressure.

The provision of means which vent the local chamber substantially, and thus bias the diaphragm against a second operation until a timed recharge can occur, and the provision of recharge timing means which become effective at this time are the most important novel features of the invention.

Such a device is suitable for use on all the vehicles of the train. It can be applied to the locomotive to control a conventional signal whistle. A local discharge valve is used on the locomotive for answering purposes. The signal valve can be applied on each car of the train in conjunction with local car discharge valves now in use on such cars. It can be so arranged on the cars as to operate the signal only when an answering signal is desired.

The McCune patent above identified includes a valve for cutting out the local signal, but this valve is subject to the objection that it can be set to close the local discharge. One feature of the present invention is the use of a local cut-out valve which may divert the local discharge air to atmosphere or to the local signal, but can never obstruct the discharge flow.

This operative characteristic of the local cut-out valve will be called, for lack of a better term, a negative lap characteristic. The term is used in the sense in which it is used in the distributing valve art to indicate that where the valve controls two ports, both ports are opened simultaneously by the valve as it passes through its mid position, the ports being closed selectively, but neither closed before the other is opened.

Another feature of the invention is an arrangement which makes use of a visible signal (light) operable by the discharged air. This renders a cut-out valve unnecessary, since the visible signal, unlike an audible signal, would not be annoying to passengers.

The invention will now be described in detail with reference to the accompanying drawings, in which:

Fig. 1 shows the installation on the motor car of the train including a constantly connected pneumatic whistle and a local discharge valve for acknowledging purposes. The signal valve is shown in partial section to indicate the connections to the whistle.

Fig. 2 is a similar view showing the signaling devices of the second and third cars of the train. In this view the signal valve on the second car is shown in partial section with connections to a local whistle through an intercepting valve which normally renders the whistle inoperative. The signal valve on the third car is shown in elevation as arranged to operate a local visual signal, i. e. a lamp.

Note: Figs. 1 and 2 when assembled left to right in the order stated make up a diagram for a complete three-car train.

Fig. 3 is a vertical axial section through the signal valve showing it equipped with a diaphragm switch as used on the third car of Fig. 2. The signal valves on the leading and second cars differ from the structure of Fig. 3 only in the substitution of a blank cover for the diaphragm switch mechanism.

In all views, the signal pipe is indicated by the numeral 6 and is equipped with the usual cut-out cocks 7 and connecting hose 8. The signal pipe 6 is charged from the head end of the train from any suitable source. Usually this is the main reservoir 9 of the brake system from which air is delivered through a normally open cut-out cock and pressure reducing feed valve 10 to a volume reservoir 11 which is directly connected with the signal pipe 6. Between the feed valve 10 and reservoir 11 is a flow restricting choke 12, but the controlling pressure connection 13 of feed valve 10 leads directly to reservoir 11 so that the choke does not disturb the regulating action of the valve. Interposed in the signal pipe 6 on the motor car is a ported pipe bracket 14a with signal valve 15a. The second car has a similar bracket 14b with signal valve 15b, and on the third car is a bracket 14c with signal valve 15c. The brackets 14a, 14b and 14c are all identical and the signal valves 15a and 15b are identical, while the signal valve 15c differs from them only by the inclusion of the diaphragm operated switch. The letters are added to the reference numerals to distinguish equipments on the different cars, but the numerals conform to those used on Fig. 3.

Refer to Fig. 3. The pipe bracket 14 has a passage 16 in free communication with the signal pipe, and into this passage is tapped at 17 the car discharge connection 18. These connections in Figs. 1 and 2 are indicated by the numeral 18 with differentiating letters a, b and c, and each leads to a corresponding conductor's discharge valve 19a, 19b, or 19c, all identical.

The passage 16 leads to a chamber 21 immediately above a flexible diaphragm 22 which is clamped at its periphery between the body 23 in which the chamber 21 is formed and a lower body 24 which encloses the balancing chamber 25. Formed in the members 23 and 24 is a charging passage 26 which is in constant restricted communication with the chamber 25 through a stabilizing choke 27. This choke is shown as including a filter capsule of known form. The passage 26 is also in one way communication with the chamber 25 through a restricted passage 28 and ball check valve 29 which is loaded in a closing direction by the coiled compression spring 31.

When signal pipe pressure predominates by a definite amount over the pressure in chamber 25, the valve 29 opens to increase the charging flow from the signal pipe to the chamber. The choke 27 is of such capacity as to provide for charging after the valve 29 is closed, and also to permit such back flow from chamber 25 to the signal pipe as is considered necessary for stabilizing purposes.

Clamped through the middle of diaphragm 22 are plates which carry the stem 32. This stem is guided for longitudinal reciprocation at 33 and carries on its lower end a poppet valve 34 which normally seats at 35 to close the vent from the chamber 25. Capacity of the vent is fixed by an interchangeable choke 36. The valve 34 is connected to the stem 32 by a pin and slot connection indicated at 37 so that the stem must rise a short distance before the valve 34 is unseated. The stem 32 is in thrust engagement with a rocker 38 fulcrumed at 39 and so arranged that upon the initial upward movement of the stem 32 the signal pipe vent valve 41 is unseated against the urge of the coiled compression spring 42.

The air vented past the valve 41 enters a chamber 43 of moderate capacity. Discharge from the chamber 43 occurs through a flow limiting choke 44. On the third car (see Fig. 2) the discharge is directed to atmosphere because in the equipment illustrated for that car a diaphragm switch subject to pressure in chamber 43 is used to operate the local signal. This diaphragm switch is enclosed in a cap 45 which clamps the actuating diaphragm 46 across an opening in the top of chamber 43. The push rod 47 and coiled compression spring 48 urges the diaphragm downward, normally permitting the resilient contactor 49 to separate from the fixed contact 51. As indicated at the right in Fig. 2, this interrupts a circuit through the wires 52, 53, battery 54, and a signal light 55 visible in the car. Hence, in the device shown in Fig. 3 and used on the third car, the response of the signal valve to a signal pipe pressure reduction develops a pressure in chamber 43 which closes the light switch and causes the light to flash momentarily in response to each signal actuation.

On the motor car shown in Fig. 1 the diaphragm switch is omitted and a simple cap 50a is substituted for the switch housing 48. On the motor car a pipe 56 conducts the air discharging from the choke 44a to the whistle 57.

On the second car, shown to the left in Fig. 2, a similar arrangement is used, but pipe 58 leading from choke 44b is connected to the body 59 of a cut-out valve. In the body 59 is a double-beat valve 61 which may be shifted by pressing the button 62 against the urge of a coiled compression biasing spring 63. In the normal position shown in Fig. 2, the valve connects the pipe 58 with an exhaust pipe 64 which discharges outside of the car. When the button 62 is pressed, this exhaust connection is closed, but only after a connection has been established from the pipe 58 to the whistle 65. In other words, the valve has the negative lap characteristic above described.

Suppose that any of the three local discharge valves 19a, 19b, or 19c is opened and allowed to close producing a short sharp pressure reduction in the signal pipe 6. The whistle on the motor car will blow, the light 55 on the third car will light momentarily, but the whistle 65 on the second car will not blow unless at that time the button 62 is held depressed. Thus, signals may be propagated from any vehicle in the train to the other vehicles.

The procedure of signaling on the first trailer is as follows:— The conductor can signal the engineer by operating the discharge valve 19b, but in order to receive the engineer's answer he must hold the button 62 depressed. He need not do this until after he has completed his own signal, but he may do so while he operates the local discharge valve, and if he does, the whistle 65 will blow in response to his own signals.

The operative cycle of the signal valve is as follows. Normally the signal pipe 6 is charged to a pressure determined by the feed valve and the chamber 25 is charged to a like pressure. The action of minor fluctuations of signal pipe pressure on the signal valve diaphragm is resisted in each valve by the spring 42 and by the leveling effect of the choke 27. Sharp reductions of signal pipe pressure cause the diaphragm 22 of all signal valves to move upward and shift their stems 32 upward. The first effect is to unseat the valve 41, producing a local limited accelerating discharge of signal pipe air. This is quickly followed, when the valve 34 is unseated, by a sharper drop of pressure in the chamber 25 and consequent descent of diaphragm 22 and closure of the valves 34 and 41.

The air vented by the valve 41, operates the local signal, i. e. the light switch, or the local whistle if connected. The effect of opening the valve 34 is to lower pressure in the chamber 25 considerably below signal pipe pressure, so that the diaphragm is incapable of responding to minor pressure waves in the signal pipe. However, recharging flow occurring through the choke 27 and through choke 28 past the valve 29 restores the sensitivity of the diaphragm after a short interval. The capacity of choke 28 and the strength of spring 31 are so chosen that the recharge period will continue beyond the period of wave action in the pipe but not longer than the normal interval between successive manipulations of the local discharge valve 19a, 19b, or 19c.

By use of the construction described the propagation rate of signals along the pipe 6 can be made extremely rapid, without risk of undesired response to secondary waves or echo. Two way signaling is had over a single pipe and where an audible signal is used on the cars other than the motor car, it is preferably normally inactive, but readily rendered active when wanted.

The purpose of the diagram formed by Figs. 2 and 3 is to indicate possible alternatives, and any of the three arrangements shown can be used on any car. The type of signal used on a particular car is a matter of selection.

While the structure of the signal valve has been described in considerable detail, its operative principles are more important than precise details of structure. Modifications within the scope of the claims are contemplated.

What is claimed is:

1. A combined signal device and accelerator for use in a railway signaling system of the type including a signal pipe which is normally maintained at a pressure above atmospheric and is subjected to short reductions of pressure initiated by local discharge valves, which device comprises in combination, a normally closed valve of limited flow capacity operable to vent air from said signal pipe; signaling means adapted to be rendered active by air so vented; means forming a balancing chamber; a movable abutment interposed between said chamber and the signal pipe; a normally closed valve of a flow capacity somewhat greater than that of the first named valve and controlling a vent from said chamber to atmosphere; operative connections whereby motion of said abutment under predominating chamber pressure opens both said valves; and means for charging said chamber from said pipe and for stabilizing the abutment against minor variations of signal pipe pressure, comprising a constantly open restricted passage between the chamber and signal pipe and a one way flow valve controlling a supplemental passage of limited capacity, and adapted to open when signal pipe pressure predominates.

2. A combined signal device and accelerator for use in a railway signaling system of the type including a signal pipe which is normally maintained at a pressure above atmospheric and is subjected to short reductions of pressure initiated by local discharge valves, which device comprises in combination, a normally closed valve of limited flow capacity operable to vent air from said signal pipe; signaling means adapted to be rendered active by air so vented; means forming a balancing chamber; a movable abutment interposed between said chamber and the signal pipe; a normally closed valve of a flow capacity somewhat greater than that of the first named valve and controlling a vent from said chamber to atmosphere; operative connections whereby motion of said abutment under predominating chamber pressure opens first the valve which vents the signal pipe and then the valve which vents the chamber; and means for charging said chamber from said pipe and for stabilizing the abutment against minor variations of signal pipe pressure, comprising a constantly open restricted passage between the chamber and signal pipe and a one way flow valve controlling a supplemental passage of limited capacity, and adapted to open when signal pipe pressure predominates.

3. A combined signal device and accelerator for use in a railway signaling system of the type including a signal pipe which is normally maintained at a pressure above atmospheric and is subjected to short reductions of pressure initiated by local discharge valves, which device comprises in combination, a normally closed valve of limited flow capacity operable to vent air from said signal pipe; signaling means adapted to be rendered active by air so vented; means forming a balancing chamber; a movable abutment interposed between said chamber and the signal pipe; a normally closed valve of a flow capacity somewhat greater than that of the first named valve and controlling a vent from said chamber to atmosphere; operative connections whereby motion of said abutment under predominating chamber pressure opens both said valves; and means for charging said chamber from said pipe and for stabilizing the abutment against minor variations of signal pipe pressure comprising a constantly open restricted passage between the chamber and signal pipe and a yieldingly loaded one way flow valve controlling a supplemental passage of limited capacity, and adapted to open when signal pipe pressure predominates by a definite amount.

4. The combination defined in claim 3 in which the flow capacity of the second named vent valve and the flow capacity and loading of the yieldingly loaded valve are so coordinated that opening of the vent valve reduces chamber pressure to a value substantially lower than the reduced signal pipe pressure concurrently existing, and the loaded valve delays restoration of pressure for a period slightly longer than the persistence of active pressure surges in the signal pipe.

5. The combination of a combined signal valve and accelerator of the type adapted to be connected with a signal pipe which is normally maintained at a pressure higher than atmospheric, said valve being adapted to respond to reductions of signal pipe pressure to discharge air from the signal pipe; an audible signal capable of being sounded by the air so discharged; a multiple way valve controlling the air so discharged and having two limiting positions, in the first of which it inhibits flow to the audible signal and directs the discharged air to atmosphere and in the second of which it directs the discharged air to the audible signal and intercepts flow to atmosphere, said valve having a negative lap characteristic whereby in all intermediate positions of the multiple way valve a flow path to atmosphere is open; yielding means biasing said valve to the first-named limiting position; and manually operable means for shifting said valve to the second named limiting position.

6. A combined signal device and accelerator for use in a railway signaling system of the type including a signal pipe which is normally maintained at a pressure above atmospheric and subjected to short reductions of pressure initiated by a local discharge valve, which device comprises in combination, a normally closed valve operable to vent air from said signal pipe; flow restricting means located beyond said valve and limiting the rate of flow therethrough; a pressure responsive element subject to the pressure between said valve and said flow restricting means; signaling means controlled by said pressure responsive element; means forming a balancing chamber; a movable abutment interposed between said chamber and the signal pipe; a normally closed valve of a flow capacity somewhat greater than that of the first named valve and adapted to vent said chamber to atmosphere; operative connection whereby motion of said abutment under predominating chamber pressure opens both said valves; and means for charging said chamber from said pipe and for stabilizing the abutment against minor variations of signal pipe pressure, said means including a one-way air flow valve controlling a supplemental passage of limited capacity, and at least one flow restricting choke interposed in a connection between the chamber and the signal pipe.

CHARLES A. CAMPBELL.